United States Patent [19]

Propp et al.

[11] Patent Number: 4,815,106
[45] Date of Patent: Mar. 21, 1989

[54] POWER LINE COMMUNICATION APPARATUS

[75] Inventors: Michael B. Propp, Brighton, Mass.; David L. Propp, Toronto, Canada

[73] Assignee: Adaptive Networks, Inc., Brighton, Mass.

[21] Appl. No.: 852,788

[22] Filed: Apr. 16, 1986

[51] Int. Cl.[4] .................. H04B 3/54; H04L 27/18
[52] U.S. Cl. ............................. 375/36; 375/96; 375/103; 340/310 R; 371/67
[58] Field of Search ............... 375/34, 36, 58, 60, 375/96, 103, 107, 118, 106, 11, 12, 14, 100; 371/67; 455/43, 116, 126, 340; 340/310 R, 310 A, 146.2; 333/176, 175

[56] References Cited

U.S. PATENT DOCUMENTS

| | | |
|---|---|---|
| 3,274,379 | 9/1966 | Hinrichs .................. 371/67 |
| 3,411,088 | 11/1968 | Hutchison ............... 455/116 |
| 3,936,749 | 2/1976 | Guillemin . |
| 4,101,834 | 7/1978 | Stutt et al. . |
| 4,177,430 | 12/1979 | Paul . |
| 4,302,844 | 11/1981 | Bruene . |
| 4,307,380 | 12/1981 | Gander . |
| 4,311,964 | 1/1982 | Boykin . |
| 4,320,523 | 3/1982 | Horikawa et al. .......... 375/103 |
| 4,365,338 | 12/1982 | McRae et al. . |
| 4,379,284 | 4/1983 | Boykin ................. 340/310 R |
| 4,398,178 | 8/1983 | Russ et al. ............. 340/310 A |
| 4,400,688 | 8/1983 | Johnston et al. . |
| 4,433,326 | 2/1984 | Howell . |
| 4,438,519 | 3/1984 | Bose . |
| 4,451,801 | 5/1984 | Monticelli . |
| 4,468,792 | 8/1984 | Baker et al. . |
| 4,471,399 | 9/1984 | Udren . |
| 4,479,215 | 10/1984 | Baker . |
| 4,510,611 | 4/1985 | Dougherty . |
| 4,517,679 | 5/1985 | Clark et al. . |
| 4,520,488 | 5/1985 | Houvig et al. . |
| 4,528,667 | 7/1985 | Fruhauf . |
| 4,556,864 | 12/1985 | Roy . |
| 4,556,866 | 12/1985 | Gorecki . |
| 4,559,520 | 12/1985 | Johnston . |
| 4,567,557 | 1/1986 | Burns . |
| 4,573,041 | 2/1986 | Kitagawa et al. . |
| 4,577,333 | 3/1986 | Lewis et al. . |

OTHER PUBLICATIONS

"The Use of Power Line Carrier Technology in EMCS", Apr. 1, 1982, prepared by Newcomb & Boyd, Consulting Engineers.

Primary Examiner—Robert L. Griffin
Assistant Examiner—Marianne Huseman
Attorney, Agent, or Firm—Darby & Darby

[57] ABSTRACT

A power line communication system specially designed for use in local area network (LAN) configurations has receiver and transmitter sections for fast, highly reliable data communication. The receiver includes controlled adaptive second order filters for ensuring data reception in virtually any signal environment having noise and distortion characteristics, especially alternating current (AC) power lines. A wideband phase shift-keyed (PSK) carrier is impressed on the transmission medium, the carrier having power spread approximately uniformly across a useful frequency bandwidth. A transmitter section is arranged for adaptive feedback control of the transmitted signal power, so as to prevent possible damage to the transmitter when the transmission medium impedance is low. A logic control circuit provides a correlation count of a received signal in comparison with a known reference signal in order to effectively achieve phase synchronization between the receiver and transmitter.

3 Claims, 5 Drawing Sheets

POWER LINE COMMUNICATION APPARATUS

BACKGROUND OF THE INVENTION a. Field of the Invention

This invention broadly relates to digital communications systems. More specifically, it concerns transmitting and receiving high speed digital information signals in binary form, such as computer data, over any noisy line medium, such as alternating current (AC) power lines.

b. Description of the Prior Art

Digital information, such as computer data, is known to be capable of transmission over existing alternating current (AC) power lines. The potential benefits of such data communication are well-recognized, including extreme versatility for interconnecting electronic office products, data terminals, remote printers, personal computers and the like. Creation of data paths may be accomplished simply by plugging the distributed terminals into any available AC outlet. Any type of equipment that can be run by a central computer could be linked to that computer through the same power cord already provided for such equipment. Such a central computer could be used to control various process equipment, including heating, lights, and air conditioning.

The presently common situation with the vast majority of users requiring digital communication lines is the use of hardwiring to interconnect the various components. This is expensive, inflexible, and generally provide higher data rates than are necessary for the average user. Since AC power wiring already exists in most, if not all, locations where data transmission is needed, reliable high-speed digital communication through this medium would provide significant cost savings and system flexibilty.

A widely available transmission medium, i.e., an AC power line in the frequency range of approximately 100 kiloHertz (kHz) to 500 kHz, generally exhibits unpredictable transmission characteristics such as extreme attenuation at certain frequencies, phase changes along the route, notches and discontinuities. Generally, three modes of noise most common: low voltage Gaussian noise, low voltage impulsive interference, and very high voltage spikes. Of these three, the low voltage impulsive interference tends to be the predominant source of data transmission errors, i.e., data transmission may be reliably accomplished even in the presence of Gaussian noise. As for high voltage spikes, they are relative infrequent and invariably cause data errors, with error detection/retransmission (ACK/NACK) being commonly recognized as the best method of recovering the lost information. Furthermore, these characteristics may vary significantly as load conditions on the line vary, e.g., a variety of other loads being added or removed from the current-carrying line. Such loads include industrial machines, the various electrical motors of numerous appliances, light dimmer circuits, heaters and battery chargers.

Past attempts to solve these problems have included a variety of single or multi-channel, narrow band transmission techniques. Narrow bandwidth, however, limits the data transmission capacity of the link. Furthermore, the changing noise environment on the AC power line significantly impairs the reliability of any technique which suffers when a transmission channel (a predetermined bandwidth) is interrupted or lost. For these and other reasons, AC power line communication has not in the past been regarded as either fast or reliable.

While multi-channel digital coding techniques have modestly improved the reliability and speed of power line communication systems, the cost of improvement has been bulky, sophisticated and expensive signal processing equipment. Thus the potential for power line data transmission has not yet been achieved, nor realistically even approached. For example, substantially error-free data transmission has been limited to data rates under ten kilobits per second (kbps). Even with such improved systems, reliability is highly suspect since any one or more of the predetermined narrow bandwidth transmission channels may suddenly become unusable, without warning, due to unpredictable variations in the power line transmission characteristics.

In recent years, data transmission over power lines has become significantly more difficult, due to changes in the nature of the distortion encountered. Due to the widespread use of personal computers and remote printers, the FCC issued regulations which place limits on conducted or radiated digital emissions from computing devices onto power lines. In order to satisfy these requirements, computer manufacturers routinely added filters appearing, from the line side, as very low impedances, such as very high capacitances having values on the order of 0.1 microfarad. This significantly affects distortion encountered by wideband signals, and at the same time can cause severe attenuation of certain narrow bandwidth signals.

Many common forms of carrier signal modulation have been attempted in connection with power line communication systems. In each of these schemes, the digital information is modulated onto a carrier and the carrier is then added to the AC power line. A receiver picks off the modulated carrier signal and then demodulates that signal to recover the digital data information. Two of the more common types are amplitude-shift keying (ASK) and frequency-shift keying (FSK). Both techniques have been generally regarded as being susceptible to electromagnetic interference (EMI) and radio frequency interference (RFI). A third principal modulation technique, phase-shift keying (PSK), has also generally been considered unsuitable because of increased susceptibility to noise interference and consequently fluctuating carrier signal attenuation.

In light of the aforementioned difficulties, power line communications has not been regarded as a potential local area network (LAN) medium, despite what should be a natural extension of LAN systems to an already existing data transfer medium reaching into virtually every office in a building, every home in a neighborhood, or anywhere else AC lines or other two-conductor media can reach. Instead, LANs are generally expensive hardwired installations delivering data transfer capacity far in excess of that required by most users (nodes) on the network.

OBJECTS OF THE INVENTION

A broad object of the invention is to provide a power line communication system capable of substantially error-free data transmission at both low and high data rates, utilizing any available existing lines, such as ubiquitous alternating current (AC) power lines, for data transmission.

Another broad object is to provide an inexpensive, highly reliable AC power line communication system capable of data transmission at faster speeds than those of presently known systems.

An object of the invention is to eliminate the need for expensive and inflexible data communication line hardwiring for otherwise portable data processing equipment.

Another object is to provide a highly flexible power line communication link requiring minimal installation, having small volume for ease of portability and reconfigurability.

An additional object of the present invention is to provide a digital data transmission system having enhanced error detection/error correction capabilities in order to increase data transmission rates.

Yet another object is to provide a power line communication system which is substantially immune to constantly changing power line data transmission characteristics, and especially robust even under impulsive noise conditions.

Still another object of the invention is to provide a power line communication system having data transfer reliability and an internal protocol sufficiently robust to allow networking between a number of devices participating in a local area network (LAN), even in token passing configurations.

SUMMARY OF THE INVENTION

According to the invention, a novel circuit is provided for data communication over noisy lines. The circuit includes a transmitter section and a receiver section, enabling two-way communication with similar circuits located elsewhere on the line. Intelligent control of the transmitter/receiver characteristics is provided for giving improved reception and transmission under constantly changing, adverse noise conditions, distortion and attenuation.

A data modulated carrier is provided using a wideband technique, creating a waveform having, in each period, substantially uniform power over the available bandwidth. Thus, sensitivity to noise, distortion and attenuation is reduced because the signal frequency spectrum is substantially wider than any impulsive noise signal, and is wide enough so that frequency dependent attenuation phenomena are reduced in effect.

The receiver includes means for receiving the noise-containing, distorted, modulated carrier signal impressed upon a line signal, such as a 60 Hz AC line voltage. The receiver also works over dead lines. The line signal, if present, is removed by appropriate filter means, leaving only the noise-containing, distorted, modulated carrier signal. Selectively controlled low and high pass filters act on the modulated carrier signal in response to control signals which may be generated by microcomputer means in a predetermined fashion. In particular, the filters may be controlled so as to seek a filtering arrangement in which distortion due to transmission over the AC lines is equalized as much as possible.

There is provided means for converting or demodulating the filtered carrier signal to a digital signal or pulse train representing discrete information bits. The resulting digital signal contains the desired "intelligence" to be recovered, and also serves as the driving signal for controlling various adaptive circuit control means, including the filters mentioned above. A logic circuit searches the incoming digital signal for recognizable data patterns in order to establish a receiver synchronization substantially in concert with the highest energy-containing portion of each new information bit. The logic circuit combines novel adaptive filter control, signal correlation means, and may also employ special error detection/error correction means in order to search, track, verify and lock onto a valid data transmission preamble for further processing by the receiver/transmitter, or by the host device, such as a personal computer, to which the inventive device is connected.

The transmitter of the invention is arranged to generate a properly modulated carrier signal encoded with information to be transmitted. The transmitted signal is a wideband signal having energy components spread substantially across the usable frequency spectrum of the transmission medium. In accordance with an aspect of the invention, the wideband transmitter is uniquely feedback-controlled so as to adaptively control the transmitted signal strength in response to changing impedances on the transmission line.

According to other especially advantageous aspects of the invention, the microcomputer means is arranged to selectively provide a variety of network access modes, including "master/slave," "token bus/token passing," and other data transfer control arrangements. The invention may be selectively operated in synchronous or standard asynchronous communication protocols over an RS-232-C interface with its host device. These features, as well as others more specifically described below, provide a PLC device useful for LAN applications, the invention achieving previously unachievable speed, reliability, versatility and ease of operation, at low cost.

BRIEF DESCRIPTION OF THE DRAWINGS

Other objects, features and advantages of the invention mentioned in the above brief explanation will be more clearly understood when taken together with the following detailed description of an embodiment which will be understood as being illustrative only, and the accompanying drawings reflecting aspects of that example, in which.

DETAILED DESCRIPTION OF THE PREFERRED EMBODIMENTS

Figures 1, 2:
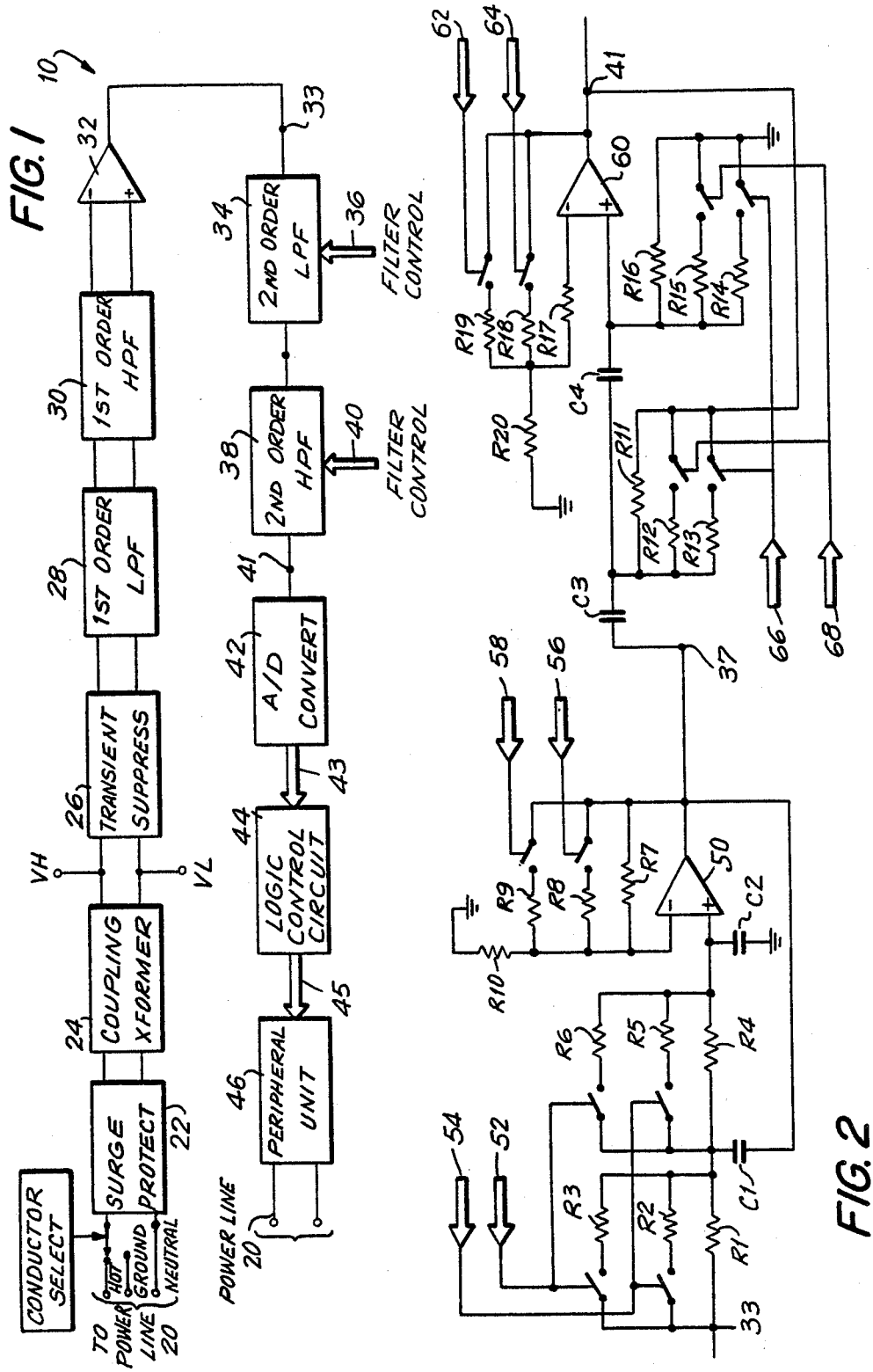
FIG. 1 illustrates, in block form, part of a circuit for receiving a wideband data signal.
FIG. 2 illustrates schematically an adaptive filtering circuit wherein the filtering is controlled in response to varying line conditions.

FIG. 1 shows part of a power line communication (PLC) circuit 10 for receiving data signals directly over a power line 20 supplying AC power to a peripheral unit 46, such as a remote printer, personal computer, or the like. Separate data wires are eliminated by the inventive circuit. The circuit 10 may be selectively coupled to the line ("hot") and neutral conductors, or to the ground and neutral conductors (not shown). In one embodiment, the AC line conductor pair to be connected to is automatically selected depending upon which of the two available pairs possesses better signal transmission characteristics at any given moment, i.e., less distortion, and better signal-to-noise ratio for the data-carrying signal.

A line surge protector 22, such as a gas tube surge absorber, may be applied across the signal line. The selected conductors, in this example hot and neutral, may be connected to the primary winding of a coupling transformer 24, the transformer removing the 60 Hertz AC voltage provided by the AC power line 20. Line signals VH and VL are taken from the secondary winding terminals of coupling transformer 24, the importance of these signals to be explained below in connection with feedback control of the inventive transmitter section.

Transient voltage suppressors 26 may be applied between each terminal of the transformer secondary and ground. First order low pass filtering 28 and first order high pass filtering 30 is applied to the received signals, using well-known filters. According to the invention, the modulated carrier used to convey data is a wideband phase shift-keyed (PSK) signal, having substantial energy across the entire usable frequency range, i.e., between approximately 100 kiloHertz (kHz) to 500 kHz. Below 100 kHz, high power noise spikes may provide interference to such an extent that any reliable transmission may be difficult. Transmission at frequencies over 500 kHz may radiate energy into the broadcast AM frequency band, in violation of applicable FCC regulations. Accordingly, the low and high pass filters 28,30 substantially confine the signal frequency to the desired bandwidth. It will be understood that in signal environments other than AC power lines, the defined usable frequency spectrum may differ, and in that case, the wideband data signal will contain energy over that particular bandwidth.

The filtered signals are applied to the inputs of a difference amplifier 32, for example, including a JFET input op amp, to provide the modulated carrier signal 33, less the common mode noise. This signal 33 will be highly distorted and will contain substantial noise components, despite the signal conditioning already applied. Second order low and high pass filters 34,38 may thus be used for equalization and additional filtering of the modulated carrier signal 33, enabling further signal processing, including reliable demodulation. In a highly advantageous manner, selectively controllable equal-component value, second order, Sallen-Key filters are used. Digital switching control 36 is provided to adaptively adjust both the cutoff frequency and damping of the low pass section 34. Similarly, digital control 40 is applied to the high pass section 38 to adjust its cutoff frequency and damping, as will be explained in greater detail below.

After adaptive equalization, the signal is converted from an analog, modulated carrier to a digital pulse signal 43 by any suitable means 42. In one simple and inexpensive embodiment, the conversion is accomplished by two-stage clipped amplification of the carrier signal 41, the output of the second amplifier then being applied to one input of a high speed comparator in a circuit using hysteresis. The digital pulse signal 43 is provided at the output of the comparator. In another embodiment, an A/D converter having longer bit length may be used to enhance processing gain, as is well known.

The digital pulses 43 are applied to a logic control circuit 44 for synchronization detection and demodulation (decoding) in order to recover the data embedded in the pulse train, as will be explained further in connection with various aspects of the logic processing circuitry. Once the information is in the form of decoded data 45, it can be passed along by the inventive PLC device to the peripheral unit 46 coupled to the AC power line 20, thus accomplishing the intended purpose of using the power line 20 for both power supply and data communication.

Referring briefly to FIG. 2, detail of the advantageous adaptively controlled, equal-component-value, Sallen-Key filter sections is shown. While selection criteria of the various circuit elements are well known, it can be seen that the arrangement of FIG. 2 permits rapid adjustment of the cutoff frequencies and damping effects of the filter sections. Looking first at the low pass section, resistors R2 and R5, and R3 and R6, may be selectively applied to alter the cutoff frequency of the filter by switches, 54 and 52, respectively, which may be CMOS analog switches. The six resistors R1–R6 may be thus provide four different frequencies, depending on the switch positions. Capacitors C1 and C2 are arranged as is customary. The feedback gain of the amplifier 50, which may include a JFET input op amp, is controlled by resistors R7–R10. Selectively coupling one or both of R8 and R9 with switches 56 and 58, respectively, controls the low pass damping. The op amp output 37 is then applied through capacitors C3 and C4 to the non-inverting input of the high pass section op amp 60. Resistors R11–R16 may be applied to the non-inverting input signal in any of four combinations to provide various high pass cutoff frequencies, depending upon selective closure of switches 66 and 68. Damping is controlled by changing the feedback gain provided by resistors R17–R20, through switches 62 and 64, in a manner similar to the low pass section. This explanation is intended as illustrative only, there being many different methods of equalizing and filtering severely distorted signals. Also, more switchable resistors could be added, increasing the number of possible filter setting combinations.

Figure 3:
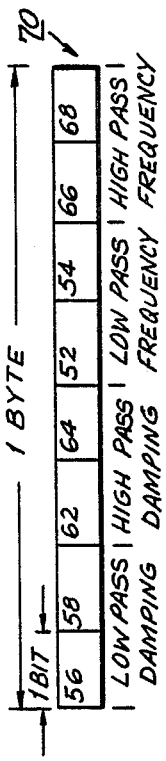
FIG. 3 illustrates a code representation of a filter control signal.

Adaptive control of the filter characteristics in order to seek and maintain a highly equalized ratio may be arranged by logic control circuitry 44, as follows. Referring now to FIG. 3, a coded control signal for switching the various resistors of FIG. 2 is shown, this format being understood to be illustrative only. In a control data byte 70 comprising eight bits 72, each bit 72 corresponds to one of the CMOS analog switches (52,54,56,62, 64,66,68) of FIG. 2. If a bit has value of logic "0", then the corresponding analog switch may be closed; if the bit is logical "1", the corresponding switch is open. Thus, when the PLC device is not receiving properly filtered data, as indicated by a high bit error rate, failure to achieve synchronization, or some other specified condition, the filter characteristics may be altered by issuing a new filter "instruction" or setting, in the form of a different sequence of logic "1"s and "0"s (another byte). In one arrangement, each one of the 256 possible instructions is tried for a predetermined period of time, on the order of 5 to 10 milliseconds, until satisfactory data reception is achieved, as evidenced by synchronization locking, low raw bit error rate, or other performance criteria.

Figure 4:
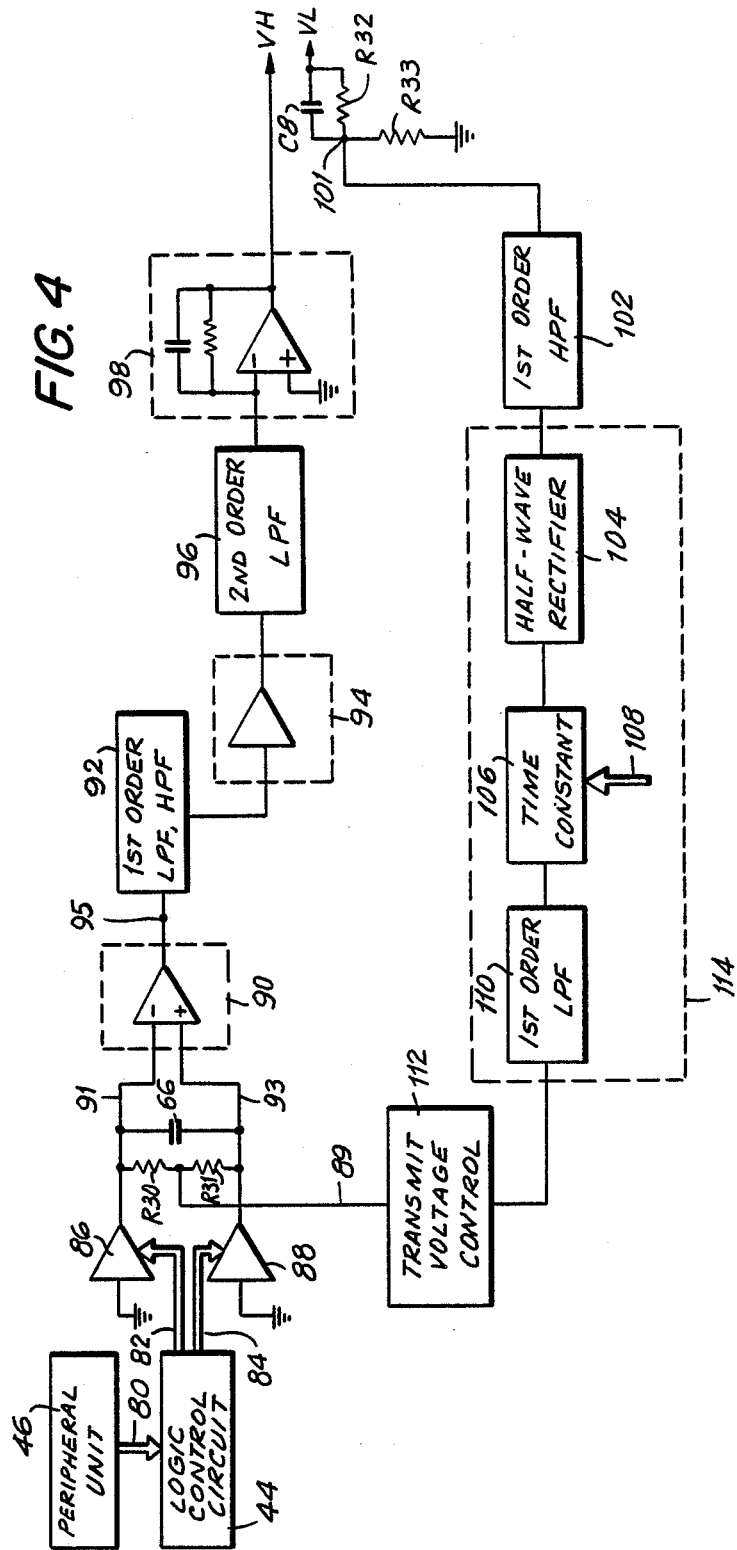
FIG. 4 illustrates schematically a circuit for transmitting a modulated, wideband carrier signal having digital data encoded therein, the power of the signal being adaptively controlled in response to changing impedance of the transmission medium.

Leaving the logic and microprocessor circuitry aside for the present, and turning now to the transmitter section of the invention, reference is made to FIG. 4, partially schematically depicting the transmitter section. In general, a transmitter is arranged to create a desired waveform from digital pulse trains provided by the logic processing circuitry. The transmitter has the advantageous feature of being able to satisfactorily transmit a waveform having power spread across a very wide frequency spectrum, e.g., 100 kHz to 500 kHz, without substantially attenuating the signal in any narrow intermediate bandwidth. In addition, the transmitter is specially adapted to impress an appropriate voltage onto the transmission medium, regardless of the prevailing impedance of the medium, even as the impedance varies.

Looking at FIG. 4, a peripheral unit 46, such as a personal computer, may provide data signals 80 to be transmitted to the logic control circuit 44 for encoding. In the present illustrative embodiment of the invention, the logic control circuit 44 supplies two digital pulse trains 82,84 roughly corresponding to the positive and negative portions of the ultimately transmitted waveform. The voltage waveform is applied to a terminal of the coupling transformer 24 secondary winding, as seen in FIG. 1, for transmission over the power line 20.

The digital pulse trains 82,84 may be applied to control the operation of tri-state buffers 86,88 in a scheme for creating the desired waveform which can have positive, negative or zero value at different points in the time domain. The tri-state buffers 86,88 are arranged to operate in two modes, a high impedance block and a very low impedance pass-through to ground. For example, when the digital signal 82 has a positive pulse value +V, buffer 86 acts as a high impedance block, thus placing a voltage signal on conductor 91 which is related to the controlled voltage level on conductor 89, through resistor R30. The significance of conductor 89 will be further explained below. Similarly, a voltage signal may be placed on conductor 93 from conductor 89 across resistor R31 when digital pulse signal 84 holds buffer 88 in its high impedance state. When the digital pulse signals 82,84 have values of zero, the respective buffers 86,88 resemble very low impedance pass-throughs, causing the voltages on conductors 91 and 93 to fall to zero. It can thus be seen that since conductors 91 and 93 are applied to a difference amplifier, which may include a JFET input op amp as is known, a waveform is created on conductor 95 which may vary between some positive and negative voltage level, such as a sinusoid centered about zero voltage.

The generated waveform according to the invention has power in a wide bandwidth covering substantially the entire usable spectrum. Thus, it is necessary to generate this desired waveform for each single carrier time period. An information bit interval may actually be one or more carrier periods in length, depending on the complexity of the synchronization circuitry employed.

A smaller number of carrier periods per bit interval provides wider signal bandwidth, the widest possible bandwidth resulting when one carrier period is used for each bit interval. Synchronization complexity is substantially reduced, however, where two carrier periods per bit are used, rather than the optimum one.

One time period of the carrier can be mapped into its frequency spectrum using known Fourier analysis techniques. In order to practically synthesize the waveform, however, the carrier period may be divided into a number of discrete sub-intervals (e.g., sixteen) each of which can assume n discrete values, such as three voltages. Furthermore, an anti-symmetric waveform may exhibit better transmission characteristics than symmetric waveforms.

If sixteen sub-intervals are used for an anti-symmetric waveform, and a pattern having three levels is desired, the power spectrum will be a function of an eight-component vector with each component being chosen from a set of three values. This yields a finite number of possible waveforms having different power spectra, which may be searched. From this group, a waveform may be chosen according to various particular criteria, including relevant FCC regulations, power distribution across the intended bandwidth, and available circuit performance. One particular waveform which has been found satisfactory is depicted in FIG. 9A, with FIG. 9B illustrating its associated power spectrum.

Figure 9A:
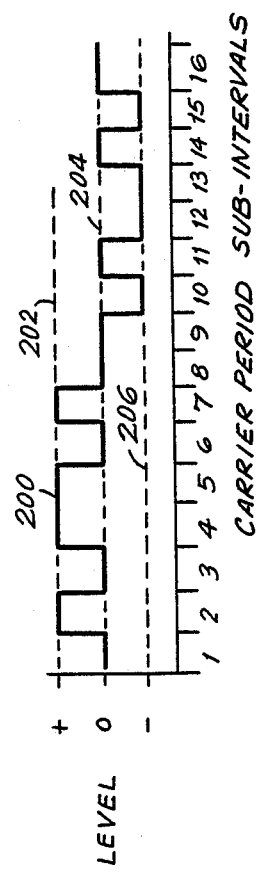
FIG. 9A illustrates a useful waveform for wideband power line communication signals.

Referring briefly to FIG. 9A, a useful waveform 200 is shown, the waveform comprising an anti-symmetric pattern of sixteen pulses. The waveform 200 is but one of the possible waveforms discussed above. Each pulse has a value of (+), (−), or zero (202,206,204). In a particular embodiment of the invention, each pulse interval is approximately 250 nanoseconds in length. The waveform is generated by controlling the tri-state buffers 86,88 as described above.

Figure 9B:
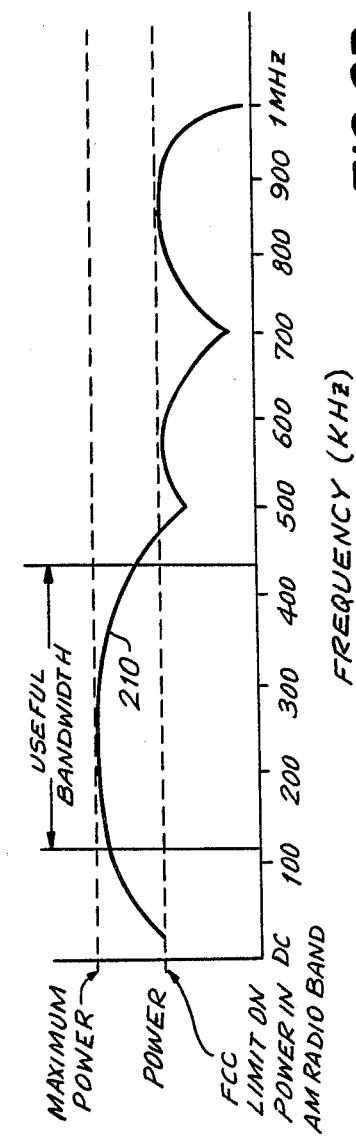
FIG. 9B illustrates a power spectrum for the waveform of FIG. 9A.

FIG. 9B shows a power spectrum 210 of the waveform 200 of FIG. 9A. The waveform 200 has been mapped into a power versus frequency spectrum using Fourier analysis as is generally known. As illustrated, substantial power is approximately uniformly spread across a useful frequency bandwith, i.e., above 100 kiloHertz and below the AM frequency band. The power spectrum remains below the external FCC design limitation for digital power transmitted in the regulated AM portion of the spectrum. The waveform is intended to be, and will be understood as illustrative only, and other waveforms may also satisfy the desired design criteria.

Before power amplification, the signal must be filtered in order to ensure that power is not radiated outside the intended frequency bandwidth. Such extraneous transmissions require power better spent elsewhere, and may run afoul of FCC limitations on radiated transmission frequencies. Accordingly, the waveform on conductor 95 is applied to first order low and high pass filters 92, with subsequent gain control 94 being applied. The particular techniques used may be customary. Second order low pass filtering 96 may also be employed, such as a unity-gain, Sallen-Key, second order low pass filter.

Figure 7:
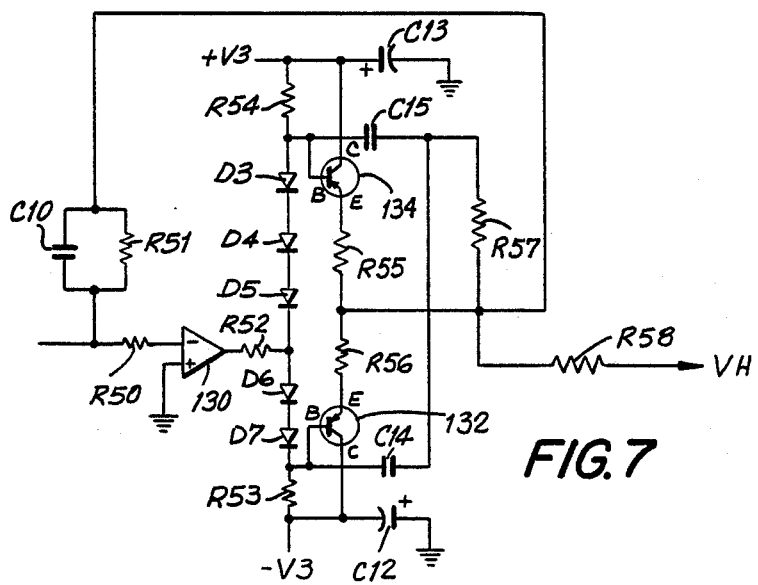
FIG. 7 illustrates schematically a transmitter power amplifier block of FIG. 4.

Finally, power amplification 98 is provided, which may be a voltage controlled voltage source (VCVS) in the general form of a feedback amplifier, having the advantageous characteristics of reduced noise, low frequency distortion and low phase distortion. In one particular embodiment of transmitter power amplifier section as shown in FIG. 7, the output of an op amp 130 is used to apply a signal to the bases of common emitter-arranged Darlington transistors 132,134. Amplifier feedback control is provided through resistor R51 in parallel with capacitor C10, through series resistor R50, and applied to the inverting input of the op amp 130, which once again may be a JFET device. The op amp output may be applied through resistor R52 to a point along a number, in this case five, of slow rectifier diodes D3-D6, such as 1N4001s. The slow diodes D3-D6 help eliminate crossover distortion, and make possible the use of lower biasing currents for the Darlington transistors 132,134. The diode network is biased by resistors R53 and R54.

A collector-to-base voltage drop of transistor 132 is provided by applying voltage $-V3$, which may be $-15$ volts, directly to the collector. As shown, the collector is coupled to ground via capacitor C12. Transistor 134 is similarly powered by the voltage $+V3$ applied directly to the collector, the collector also coupled to ground through coupling capacitor C13.

The emitter voltages of transistors 132 and 134 are applied, through resistors R55 and R56, respectively, to the amplifier output VH, through resistor R58. Analog switches (not shown) may be used to bypass op amp 130, and to isolate the transistor bases from their supply voltages $+/-V3$, when the transmitter is not operating. In this situation, the line voltage appearing at VH is capacitively coupled to both transistor bases via series-coupled resistors R57,R58 and then through capacitors C14 and C15. This arrangement advantageously causes the transistor base voltages to float with VH, ensuring that the transistors 132,134 remain off and quiet.

As mentioned earlier, the transmitter is arranged so as to place a proper voltage level on the power line 20 despite changing impedance of the line. This is now explained with reference to the as yet unexplained portion of the illustrative circuit shown in FIG. 4. The modulated waveform at VH is applied to one terminal of the coupling transformer 24 secondary winding. VL is coupled to the other secondary winding terminal, as shown in FIG. 1. VL is also connected to capacitor C8 in parallel with resistor R32. The voltage 101 at the low side of resistor R32 is applied to grounded resistor R33. Thus, the voltage drop across R33, as indicated at 101, is related to the voltage placed on the power line by the transmitter at VH. Since a particular voltage range can be considered optimum for the transmitted signal, the detected voltage 101 is used to control the original signal levels provided by tri-state buffers 86 and 88.

One arrangement for accomplishing this feedback control is suggested in FIG. 4. Voltage 101 may be applied to first order high pass filter 102 so as to eliminate unwanted signal in the frequency band not of interest. Means 114 for determining a control signal related to the average transmitted power is provided. For the sake of simplicity, a half-wave rectifier 104 may be used to cancel the negative signal portions which would act to cancel out the detected power altogether, it being understood that the detected signal will be related to one-half the total transmitted power. The rectified signal is applied to a time constant circuit 106 having microcomputer control 108 for adjusting the time response of the feedback loop, the response being quick when transmission first begins, but then slowing down as transmission is continued. This prevents amplifier operation at improper levels for extended periods of time. An average power level may then be provided by first order low pass filtering 110, using known filters.

The detected average power is applied to a transmitter voltage control circuit 112, which provides the unamplified signal voltage levels to conductors 91 and 93 through resistors R30 and R31, respectively.

Figure 5:
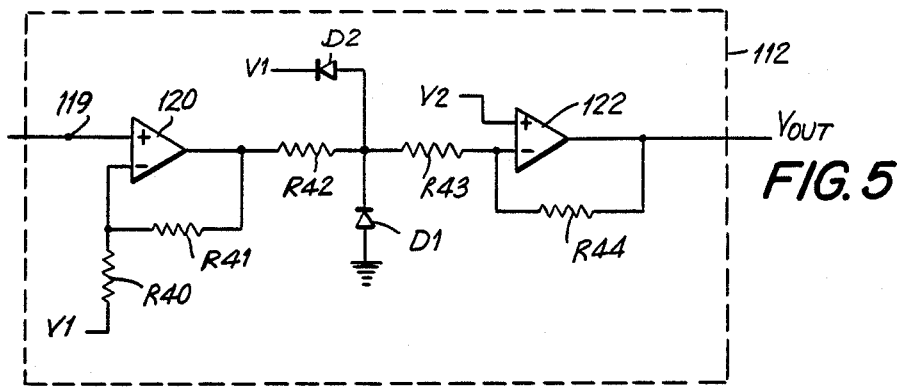
FIG. 5 illustrates schematically the transmit voltage control block of FIG. 4.
Figure 6:
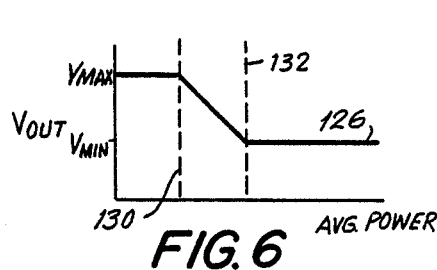
FIG. 6 illustrates a voltage supply function provided by the transmit voltage control circuit of FIG. 5.

The transmitter voltage control circuit 112 may be any arrangement which provides a certain voltage output as a function of voltage input. One such function is shown, as an illustrative example only, in FIG. 6, a curve 126 of control circuit 112 output voltage $V_{OUT}$ as a function of average transmitted power. For average power above a certain level 132, the output voltage is held at a first level $V_{min}$. For detected average power less than another certain level 130, the output voltage may be $V_{max}$. In a range between the two levels 130 and 132, the output voltage may monotonically decrease from $V_{max}$ to $V_{min}$. Such a function is provided by the control circuit 112 shown in FIG. 5. Negative feedback amplifiers, which may include JFET input op amps 120,122 and resistors R40-R44 as is customary, are series-coupled, the output, of the first op amp 120 applied to the inverting input of the second op amp 122. At a point between the op amps 120,122, the voltage is clipped by switching diodes D1 and D2, one diode D1 coupled to ground, and the other being supplied a voltage V1 which may, or the sake of convenience, be equal to a voltage supplied to the inverting input of the first op amp 120 through resistor R40. Voltage V1 may be, for example, 3.3 volts. The non-inverting input of the second op amp 122 receives an applied voltage V2, which is equal to $V_{min}$, and which may be, for example, 2.76 volts. $V_{OUT}$ is thus increased as the inverting input voltage of op amp 122 goes further negative from zero. In this manner, the transmitted power is feedback controlled in response to changes in detected voltage 119.

According to another aspect of this control, the component values for C8, R33, and R58 may be specially chosen so as to permit proper transmitter operation in series combination with the inductance of the peripheral unit's line cord, even when the transmission medium impedance is so low as to approximate a short circuit. The impedance may, of course, be capacitive, resistive or inductive, or any combination of the three. It is estimated that the lowest impedance which might be encountered would result from a resistance on the order of 1-2 ohms, a capacitance of approximately 0.2 microfarads (the line side capacitance caused by a personal computer's FCC-required filter), and roughly a 1-2 microhenry inductance.

The following is a list of component values for one embodiment of the invention as described above (resistors in ohms, capacitors in picofarads, except as noted):

| Resistors | | Capacitors | |
| --- | --- | --- | --- |
| R1,R4 | 1.10k | C1 | 720 |
| R2,R3,R5,R6 | 5.76k | C2 | 180 |
| R7,R8,R9,R10 | 5.76k | C3,C4 | 330 |
| R11,R13 | 2.43k | C6 | 180 |
| R12 | 3.74k | C8 | 0.5 microfarad |
| R14,R16 | 9.76k | C10 | 100 |
| R15 | 15.0k | C12,C13 | 10 microfarad |
| R17,R18 | 9.76k | C14,C15 | 10 nanofarad |
| R19,R20 | 9.76k | | |
| R30,R31 | 887 | | |
| R32 | 10 | | |
| R33 | 2.7 | | |
| R40 | 34.8k | | |
| R41 | 40.2k | | |
| R42 | 2k | | |
| R43 | 52.3k | | |

| Resistors | | Capacitors |
|---|---|---|
| R44 | 34.8k | |
| R50 | 150 | |
| R52 | 620 | |
| R53,R54 | 15.0k | |
| R55,R56 | 1.2 | |
| R57 | 2k | |
| R58 | 2.7 | |

In order to properly receive and decode data communications, the receiver section must search for and lock into synchronization with the carrier signal phase. Means are provided for comparing a received signal with a predetermined signal known to identify an information bit, as opposed to noise. Generally, the received signal is repetitively compared with the known reference until a certain level of correlation is found to exist between the two patterns. It should be noted that substantially similar rates of transmission and reception among all transmitters and receivers must be maintained in order to properly examine the correlation. In one embodiment of the invention, each circuit is provided with a crystal oscillator as a pulse timing reference. Since crystals having accuracies on the order of 100 parts per million are readily available, use of a crystal having a frequency of, for example, 4.3008 megaHertz, completely eliminates the prior need for tracking the data signal frequency.

A receiver may sit idle when neither receiving nor transmitting data. The receiver will monitor signals coming over the power line, however, in the event that a data transmission has been initiated. A special series of information bits may be provided for allowing the receiver to capture and verify the signal. In a phase shift-keyed carrier, logic "1" and logic "0" have equal, but inverted, waveforms. Thus, the special series might be identified, in part, by a sudden change in sign of a sufficiently high correlation count.

Figure 8:
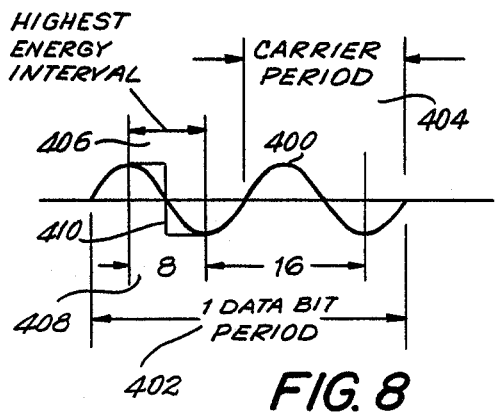
FIG. 8 illustrates a data bit period according to the invention, detailing the particular wave characteristics used in a synchronization scheme.
Figure 10:
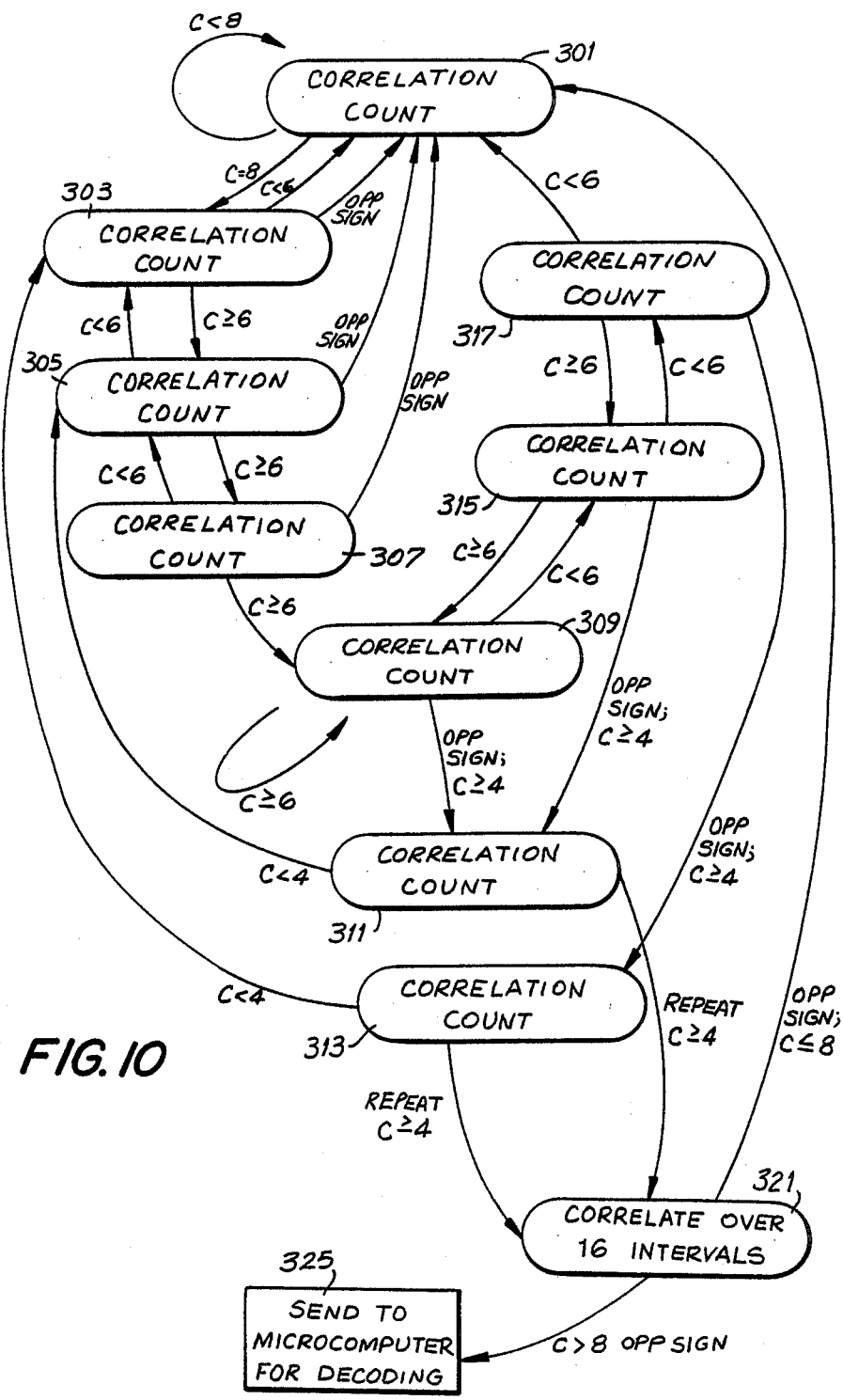
FIG. 10 is a state diagram depicting a method of searching for and verifying reception of a data signal.

The search/verification scheme is described in conjunction with FIGS. 10 and 8. Referring briefly to FIG. 8, certain details of the searching scheme are explained. In an embodiment of the invention, a data bit period 402 is equal to two successive carrier periods 404, here represented as perfectly undistorted sine waves. It will be understood that the actual waveform will be highly distorted and in practice, the highest energy portion is clearly the waveform segment indicated. If a carrier period 404 is divided into sixteen intervals, it is seen that an 8-interval segment 408 can be created over the interval of the wave having the highest energy content. This portion of the signal may be roughly approximated by a step waveform 410 over the 8-interval segment, and it is this step segment 410 which is used as the reference for correlation according to the invention. The resulting count for the 8-interval correlation may range from $-8$ to $+8$, the latter representing perfect correlation, the former representing a perfect but inverted waveform.

Referring now to FIG. 10, a state diagram for a power line communication synchronization scheme is shown. The state diagram may be embodied in logic circuitry including a classical finite state machine, using well known techniques. When a signal appears on the transmission medium, the signal is correlated with the known reference signal interval. In this embodiment, a user data message is prefaced by a sequence of bits, e.g., seven "0"s followed by a "1", followed by a signature byte which is as unrelated as possible to either the sequence of seven "0"s followed by a "1", or its opposite, seven "1"s followed by a "0".

A correlation count is obtained in an initial "state" 301. If perfect correlation is found ($C = +8$), it is possible that the beginning of a sequence of seven "0"s has been located, and the control moves to a next state 303 in order to begin the process of verification. A new correlation count is obtained at a point shifted in time from the previous correlation count, in order to test the next expected signal for presence of the reference interval. The shift corresponds to skipping an 8-interval segment of the waveform which would be expected to correlate with the opposite sign. If perfect correlation had not been found (C less than $+8$), another count would be made at state 301. According to the invention, this process is monitored by a microcomputer. If a number of correlation counts have been made without success, the system adaptively changes the receiver filtering by issuing a new instruction byte 70, as explained in conjunction with FIGS. 3 and 4. This general pattern continues as explained below.

In the second state 303, a sufficient correlation count will elevate control to the next state 305. From this point on, correlation sufficiency may signify a count greater than or equal to $+6$. It should be apparent that this is merely one particular embodiment of a synchronization scheme, many others being possible. If the count at state 303 was insufficient (C less than $+6$, or wrong sign), then control drops back to the first state 301. (The proper sign must be determined at the beginning of the process.) This pattern continues identically through the next two states 305,307, until state 309 is achieved. Achievement of state 309 signifies that successful correlation has occurred four times, and at this point, there may be some confidence that the sequence of "0"s followed by the "1" is actually being received.

State 309 is maintained so long as successful correlation counts are obtained. The system is now waiting for a sufficiently high count having the opposite sign which signifies the end of the predetermined pattern, at which time state 311 is reached. During this waiting period, if an insufficient count is obtained (C less than $+6$), another intermediate waiting state 315 is achieved. Upon the next successive correlation count, control will either be returned to the previous waiting state 309, or dropped to a lower confidence level waiting state 317 (since two bad counts have thus occurred consecutively, indicating that the bit sequence may, in fact, have been no more than noise). From either of states 317 or 315, a good correlation will raise the confidence level back toward waiting state 309. An insufficient count (C less than $+6$) while at state 317 will cause operation to restart at the beginning state 301 (three successive bad counts obtained strongly indicates reception of noise).

From any of states 309, 315 and 317, a sufficiently high correlation count having an opposite sign causes elevation to one of states 311 and 313. If the next succeeding correlation count while in either of these states is insufficient (C less than $+4$), operation is dropped back to level 305 or 303, respectively, in an attempt to pick up the special bit sequence again. If the count is sufficient when in state 311 or 313 (a repeat of C greater than or equal to 4, opposite sign), a very high confidence state 321 is reached. At this point, a final correlation count is taken over the next 16 immediately succeeding intervals, i.e., one full carrier period. If a 4-bit counter is being used, it is apparent that the value cannot go any higher than $+8$, nor any lower than $-8$. For such an implementation, all correlation counts which are better than −8 (covering three-quarters of the possibilities, since an actual −10 will only read as −8 due to the bit limitation of the up/down counter) will cause the logic control to begin dumping the data to the microcomputer. In the very rare instance that the count is −8 (signifying anything from −8 to −16), the entire process is aborted and then restarted from state 301.

It should be noted that the receiver synchronization may be shifted in time, even substantially, from the actual start time of a transmitted bit interval. This is made possible by correctly selecting both the transmitted waveform and the demodulation reference waveform. This contributes to the important benefit that the PLC system according to the invention will successfully synchronize in the presence of a wide variety of line characteristics.

Once it has been assured that data bits are being received, network access control may be transferred to a microcomputer, as mentioned previously. Special data link protocols for use in local area networks (LANs) are known, but these protocols are not, in general, sufficiently robust so that data may be accurately communicated over a medium which is highly error-prone. For example, data may be transmitted in packets, each packet containing a large number of bytes. Error checking, such as CRC, may be added to the end of the packet. When transmitting over power lines, however, the probability of error is so high that the value of such known error checking methods is reduced. Thus, packets are advantageously broken apart and reconfigured into smaller frames, since the probability of receiving an erroneous frame is much lower than that of receiving an erroneous byte somewhere in a packet.

Another advantage of using smaller size frames is that it becomes possible to employ various error correction techniques in combination with error detection techniques to provide an extremely reliable data link. In particular, it is desirable to provide correction for all single bit errors in a transmitted byte, and also all two-bit burst errors. An error correction code/error detection code may be provided which substantially accomplishes this goal.

As an example, assume transmission of a byte having eight bits is desired. To perform error correction, an 8/4 code might be provided which encodes one-half the byte at a time, mapping the four bits into one of sixteen possible 8-bit codewords. The codeword is transmitted, and then decoded by looking it up in a decoding table 256 bytes long ($2^8$ possibilities). Any codeword which contains errors will be assumed to have originated as one of the 16 "real" codewords, i.e., some correspondence may be predetermined between the 16 real codewords and the 240 spurious codewords.

Very serious errors, i.e., so bad that the scrambled codeword byte might even resemble another "real" codeword when received and decoded, may be handled by the addition of error detecting code (edc). The original data byte is mapped to a corresponding edc byte of 8 bits. This edc byte is then split up, each four bits are mapped into codeword bytes using the error correction table and transmitted as well. Thus, it should be apparent that the particular embodiment being described is relatively inefficient, each data byte requiring four transmitted error correct-coded bytes: for the first four bits of the data byte; for the last four bits of the data byte; for the first four bits of the edc byte; for the last four bits of the edc byte. When the edc byte is reconstructed, it is mapped back to something which, if all has gone well, is the original data byte. If not, a serious error has been made and retransmission may be requested. These are only some of the many features which a PLC system should handle in implementation of a data link protocol.

As thus described, a novel power line communication system is provided, having vastly improved reliabilty and higher data transmission rate than previously known PLC systems. As will be plain to those skilled in the art, a great number of variations, modifications and additions may be made to the disclosed detailed embodiment, which is illustrative only, without departing from the spirit or scope of the invention. For example, as digital technology continues to progress, it will become economical to perform much of the filtering and equalizing with purely digital devices, instead of the familiar resistance-capacitance networks as described. Waveshaping may also be economically accomplished with digital devices at some point At the present time, however, the invention in a form as disclosed can be manufactured and sold at a very low cost, less expensive than other known systems by as much as an order of magnitude or more in price difference. It is especially adapted for use in local area network (LAN) configurations, providing an internal protocol which provides fast, reliable network access and control over the transmission medium, whether in a master/slave, distributed master, or token bus/token passing mode of communication and control.

The invention is limited only by the appended claims.

What is claimed:

1. A data communication system for communicating a data signal between a first location and a second location over a line having at least a first conductor and a second conductor, the system comprising, at each location:
    means for deriving from said line a received wideband signal having power distributed substantially uniformly over a predetermined frequency bandwidth;
    means responsive to a first control signal for adaptively filtering said received wideband signal to reduce distortion and noise components of said received signal so that said received signal is thereby substantially equalized;
    means for converting said substantially equalized received signal into a periodic serial output stream of binary bits;
    means for comparing each of a number of successively received groups of bits in said stream of binary bits to a reference signal at a number of different relative phases;
    means responsive to said comparing means for generating a number of count values representing degrees of correlation between each of said groups of bits and said reference signal;
    means for identifying a series of groups of bits whose count values match a predetermined pattern of count values; and
    means for generating said first control signal in response to an absence of a matching series of count values for a predetermined period of time.

2. The data communication system of claim 1, further comprising:
    means for converting a periodic serial input stream of binary bits into a transmit wideband signal having power distributed substantially uniformly over a predetermined frequency bandwidth;

means for applying said transmit wideband signal having a first power level to said line;

means for sensing an impedance of said line;

means responsive to said sensing means for adjusting said first power level to a second power level to protect said applying means from damage.

3. The data communication system of claim 2, wherein said adjusting means adjusts said signal applying means rapidly upon beginning transmission of said transmit wideband signal, and more slowly as transmission is continued.

* * * * *